United States Patent
Thompson et al.

[15] 3,641,414
[45] Feb. 8, 1972

[54] TRANSDUCER SYSTEM WITH FLOATING INPUT CIRCUIT AND CONSTANT CURRENT OUTPUT ELECTRONICS

[72] Inventors: Burton J. Thompson, Mount Lake Terrace; Melvin O. Eide, Bellevue, both of Wash.

[73] Assignee: United Control Corporation

[22] Filed: Oct. 16, 1970

[21] Appl. No.: 81,474

[52] U.S. Cl. ................................. 318/662, 318/678, 330/24
[51] Int. Cl. ........................................................ G05b 1/06
[58] Field of Search ............................. 318/662, 678; 330/24

[56] References Cited

UNITED STATES PATENTS

| | | | |
|---|---|---|---|
| 3,080,513 | 3/1963 | Edwards | 318/662 |
| 3,421,059 | 1/1969 | Takahashi | 318/662 |
| 3,421,060 | 1/1969 | Irvine | 318/662 |
| 3,482,175 | 12/1969 | Eide | 330/24 |

*Primary Examiner*—Benjamin Dobeck
*Attorney*—Hofgren, Wegner, Allen, Stellman & McCord

[57] ABSTRACT

A servoed transducer system uses differential sensing capacitors to detect the movement of a pivoted seismic mass. Electrostatic forces across the sensing capacitors are reduced by electrically floating the capacitors and using stray capacitance to a torque coil on the seismic mass to complete a pickoff sensor and detector circuit which generates an error signal in response to movement of the seismic mass. A servoamplifier maintains a constant current through the torque coil for a fixed error signal in order to rebalance the seismic mass.

11 Claims, 4 Drawing Figures

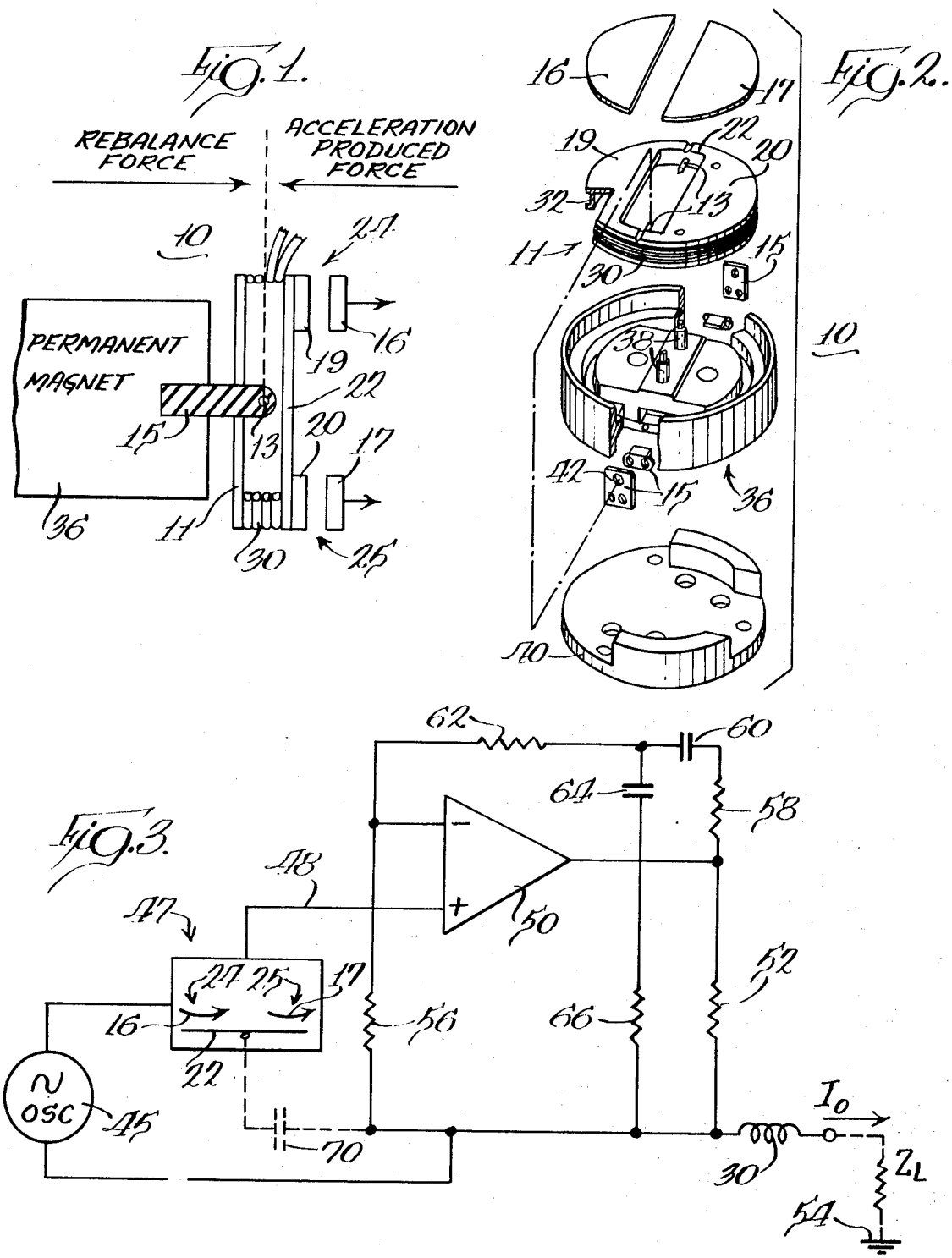

TRANSDUCER SYSTEM WITH FLOATING INPUT CIRCUIT AND CONSTANT CURRENT OUTPUT ELECTRONICS

This invention relates to an improved transducer system which combines a floating input or pickoff circuit with constant current output electronics.

Various transducer systems using a force movable seismic element detect movement of the element by monitoring the reactive impedance of a device such as differential capacitor. One portion of the pickoff device is typically mounted to the seismic element, and the other portion is fixed relative to a frame, so that a change in distance therebetween, in response to movement of the seismic element, varies the reactive impedance of the device. Usually, conductors are connected to both portions of the pickoff device in order to couple the device to a detector for producing an error signal proportional to detected movement. In a servoed transducer system, such as an accelerometer of the closed-loop pendulous design, the error signal drives a servoamplifier which passes current through a torque coil wound about the seismic mass in order to generate a rebalance force which returns the seismic mass to a null position. Current from the servoamplifier is also coupled to an external load to provide a measure of the locally generated rebalance force, and hence provide a measure of the original external acceleration or unbalancing force.

It has been disclosed by one of the applicants herein that the variable reactive sensor can electrically float and be referred to the input detector and amplifier output circuits. Such a disclosure is contained in application Ser. No. 718,797 filed Apr. 4, 1968 by Melvin O. Eide, entitled "Amplifier with Floating Input," assigned to the assignee of the present application, now U.S. Pat. No. 3,482,175, issued Dec. 2, 1969. The servoamplifier in the above disclosure was not of the constant current output electronics type, and hence lacked certain advantages as will appear.

In an attempt to provide some of the advantages of constant current output electronics, it has been known to design a servoed accelerometer of the open-loop servoamplifier type, having a modified output circuit of the current electronics type, rather than the voltage electronics type. Such a design, in addition to lacking precise accuracy of measurement, has not solved problems caused by the effect of different load impedances, and the creation of electrostatic forces across the pickoff sensor as a function of the output signal voltage.

In a copending application of another one of the applicants, Ser. No. 966, filed Jan. 6, 1970 by Burton J. Thompson, entitled "Servoed Transducer System," assigned to the assignee of this application, an improved servoed transducer system using constant current output electronics is disclosed. The servoamplifier uses a feedback circuit to form a closed loop amplifier which maintains constant current through a rebalancing torque coil when the external force has a fixed value, regardless of the impedance of the external load. While this servo amplifier is an improvement over the above described open-loop type, the amplifier does not provide a floating pickoff sensor and input circuit referred to the amplifier output. As a result, the pickoff sensor and torque coil must both be referred to signal ground potential in order to eliminate electrostatic forces acting on the seismic element in addition to the external unbalancing force. This requires that the torque coil be part of the external load circuit, restricting the acceleration range due to temperature compensation problems involved in matching the load impedance to the torque coil. Also, the load impedance of the servo amplifier is returned to a potential common with a potential in the pickoff sensor circuit, limiting the choice of acceleration ranges and requiring additional electrical conductors between the transducer and the external load, which may be at a remote point.

In accordance with the present invention, all of the above disadvantages have been eliminated by combining, in a servoed transducer, an electrically floating pickoff sensor with current output electronics. This has been accomplished without destroying any of the advantages of the individual circuits. A common line or DC path is provided between the torque coil and the pickoff detector to allow the same to float and be electrically referenced together. This is accomplished while still providing a feedback path from the torque coil to a differential amplifier in the servoamplifier so as to maintain constant current to the torque coil when the external force has a fixed value, regardless of the impedance of the external load. Since the same constant current would occur even if the torque coil were replaced by any load impedance of equivalent value, the dynamic response characteristic of the servo is greatly improved.

A principal object of this invention is the provision of an improved transducer system combining a floating input circuit with constant current output electronics.

Further features and advantages of the invention will be apparent from the following specification, and from the drawings, in which:

FIG. 1 is a diagrammatic illustration of a servoed transducer having a floating pickoff sensor;

FIG. 2 is an exploded diagram of an exemplary type of servoed transducer using the principle illustrated in FIG. 1;

FIG. 3 is a partly block and partly schematic diagram of a force-measuring circuit using the transducer of FIG. 1; and FIG. 4 is a schematic diagram illustrating in detail the circuit of FIG. 3.

While an illustrative embodiment of the invention is shown in the drawings and will be described in detail herein, the invention is susceptible of embodiment in many different forms and it should be understood that the present disclosure is to be considered as an exemplification of the principles of the invention and is not intended to limit the invention to the embodiment illustrated.

Turning to FIG. 1, a transducer 10 for measuring a force quantity uses a seismic element 11 pivotally mounted at 13 to a frame structure 15. To detect movement of seismic element 11, a variable reactive device includes elements 16 and 17 fixed with respect to the frame 15, and elements 19 and 20 mounted to the seismic mass 11. By way of example, the variable reactive device may take the form of differential sensing capacitors, in which elements 16 and 17 are plates of the capacitor, spaced from the elements 19 and 20 which form further plates of the capacitor. The plates 19 and 20 are mechanically and electrically mounted to a metallic member 22 forming a portion of seismic mass 11.

Movement of pivoted seismic mass 11 causes a differential change in capacitive reactance between the plates 16 and 19, forming a capacitor identified by numeral 24, and between the plates 17 and 20, forming a capacitor identified by numeral 25. In accordance with the present invention, electrical conductor means is connected to the capacitor plates 16 and 17, but the metallic element 22 and connected capacitor plates 19 and 20 are not connected through an electrical conductor to a detector circuit, but rather are returned through stray capacitance between a torque coil 30 and the metallic seismic element 22. Thus, the capacitor plates 19 and 20 are returned to the torque coil 30 and hence to the amplifier output and pickoff detector, and are therefore electrically floating with respect to the circuit ground return.

While not limited thereto, transducer 10 may be incorporated in a servoed transducer system of the exemplary type illustrated in more detail in FIG. 2. A force balance accelerometer is illustrated using servomechanical capture of a seismic mass. By action of the servo, the seismic mass 11 is returned to a level position, balancing the input acceleration force with automatically generated feedback force which is proportional to the servo current through the torque coil 30 carried by the seismic mass. Capacitor plates 19 and 20 may be formed as planar portions of an integral upper surface 22 for a bobbin 32 around which the torque coil 30 is wound.

Capacitor plates 16 and 17 are disposed parallel to the capacitor plates 19 and 20, and are fixed with respect to the frame 16 which includes a permanent magnet assembly 36 having a pair of upstanding posts 38. Typically, the capacitor plates 16 and 17 may be formed of metal deposited on the bottom of an insulated plate (not illustrated) fabricated of ceramic material and affixed to the upstanding posts 38. The magnet assembly may be fixed to a base 40 adapted to be secured to a support structure, the acceleration of which is to be measured. The seismic mass 11 is rotatably or pivotally mounted at pivot points 13 which extend into concave sockets 42 which serve as bearings fixed to the frame structure. As illustrated, the sockets 42 form a part of a preload spring flexure assembly for maintaining a predetermined amount of preload on the bearings. This preload spring flexure assembly is of the type disclosed in a copending application "Preload Adjustment Means For A Transducer," Ser. No. 855,839, filed Sept. 8, 1969, applicant Jack A. Morrow, and assigned to the same assignee as this application, to which reference should be made for a more complete disclosure.

In accordance with the present application, the common capacitor plates 19 and 20 (which are integral portions of planar surface 22) are electrically floating with respect to the transducer 10. This may be accomplished by insulating the planar section 22 from the case ground by any known technique, and is illustrated diagrammatically in FIG. 1 by an electrically insulated frame member 15.

In FIG. 3, an equivalent diagram of a force-measuring circuit for use with the transducer 10 of FIGS. 1 and 2 is illustrated. An oscillator 45 provides a sinusoidal signal, typically above 10 megahertz, to a bridge and detector circuit 47 includes the capacitor 24 and 25 which have equal capacitance values when no external force is present. In response to an unbalance in capacitance between the capacitors 24 and 25, the circuit 47 generates an error voltage on a line 48 which is proportional to the difference in capacity. The error signal on line 48 is coupled to the (+) input of a differential amplifier 50 which supplies current through a resistor 52 and thence through the torque coil 30 to a load impedance $Z_L$ connected to a source of reference potential or ground 54. Feedback to the (−) input of differential amplifier 50 is provided by a resistor 56 connected to the junction between resistor 52 and torque coil 30, and by a feedback path including a resistor 58, a capacitor 60, and resistor 62 connected in series between the output of amplifier 50 and the (−) input. A capacitor 64 and a resistor 66 are connected in series between the junction of resistor 62 and capacitor 60 and the junction between resistor 52 and resistor 56.

As previously mentioned, the planar capacitor member 22 is not directly connected to the force measuring circuit. To complete an electrical path allowing sensing of the differential change in capacity, a portion of the force measuring circuit is located sufficiently close to the planar member 22 to produce a stray capacitance 70 therebetween of sufficient capacitive reactance to AC couple the planar member 22 to the measuring circuit.

Assuming the system is initially in a null state, a change in acceleration generates an error signal on line 48 proportional to a constant multiplied by the differential change in capacity. The error signal is amplified by differential amplifier 50 and generates a current which flows through the series combination of resistor 52, torque coil 30, and load impedance $Z_L$. The current $I_0$ through the torque coil 30 generates a magnetic field which interacts with the magnetic field of permanent magnet 36, FIG. 1 to rotate the seismic mass 11 about the pivot point 13 and return the mass to a balanced or null position. The electronically generated rebalance force is equal and opposite to the acceleration force, and maintains the seismic mass in a fixed position captured mode. The magnitude of current $I_0$ through the load impedance $Z_L$ generates a voltage output which directly indicates the amount of rebalance force, and hence the external acceleration produced force. Any known measuring circuit may be connected as the load impedance $Z_L$ in order to provide an indication of the measured acceleration.

Constant current output electronics results from the use of the feedback path which substracts a signal proportional to the torque coil current from the error signal. The amount of feedback is proportional to the voltage drop developed across resistor 52, which is essentially due to the output current $I_0$. Capacitor 60 provides open circuited feedback at DC or very low frequencies to produce high static gain and tight capture. Capacitor 64 used to lead (increase) the gain at some frequencies within the servo bandpass, as necessary for stability. This is accomplished by reducing the amount of feedback by shunting current through capacitor 64 and resistor 66.

The force measuring circuit of FIG. 3 has a number of advantages. The floating input circuit for detector 47 allows the load impedance $Z_L$ to be returned to any potential, at a remote point, which is within the range of available power supplies. Undesirable electrostatic fields are not developed across the differential capacitors 24 and 25 due to remote ranging. Also, the output current $I_0$ is essentially independent of the load impedance $Z_L$. The circuit is a current output type which can be externally ranged using complex load impedances, without disturbing the servo characteristics. External gain adjustments are not required during ranging.

Figure 4:
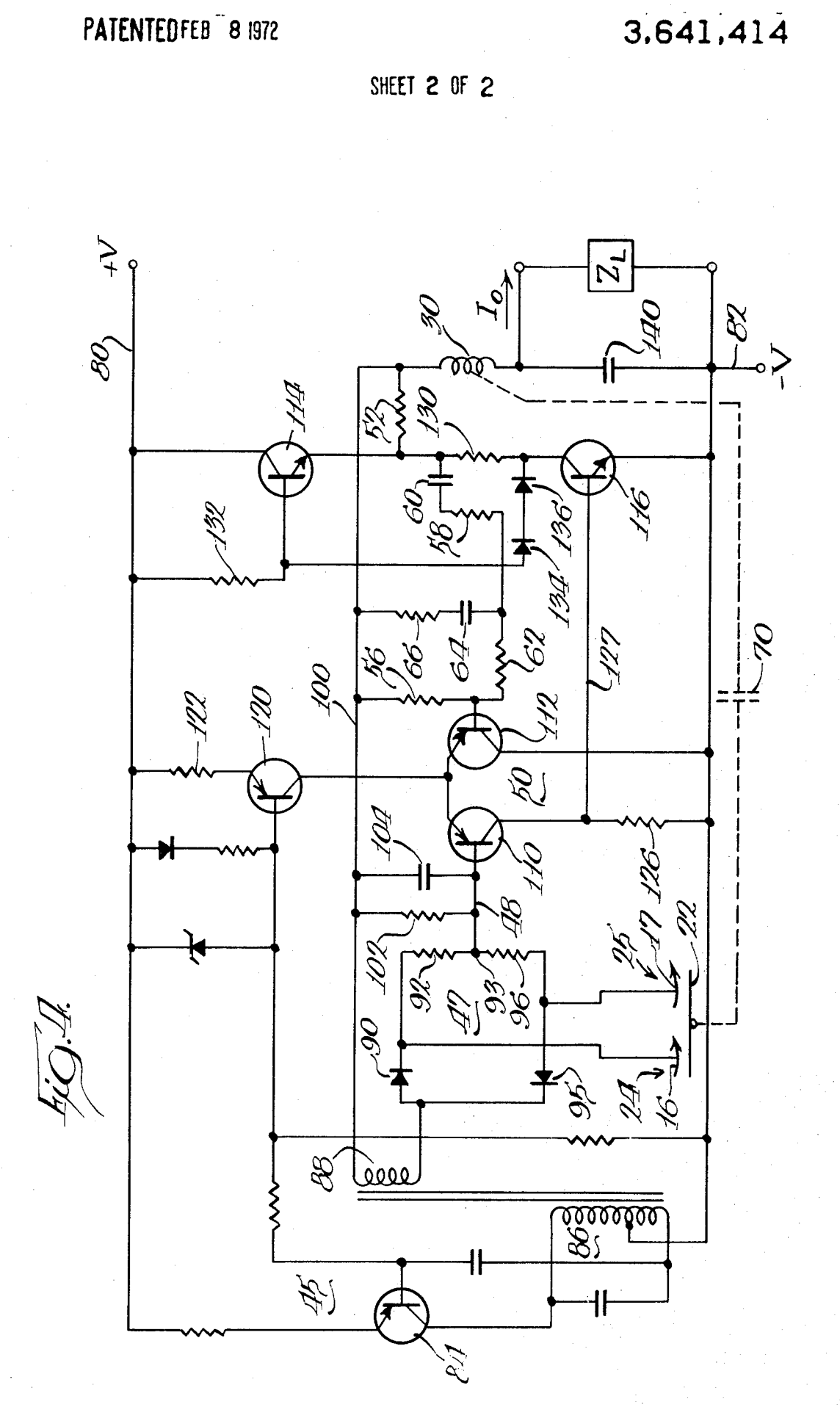

In FIG. 4, the force-measuring circuit of FIG. 3 is illustrated in detail. For clarity, conventional extraneous RF suppression and bypass components have been omitted from he illustration. External power is applied between a positive line 80, or +V, and a negative line 82, or −V. Oscillator 45 includes a PNP transistor 84 connected as a single ended class A oscillator having a resonant frequency typically above 10 megahertz. A tank network 86 connected to the collector of transistor 84 couples output oscillations across a secondary coil 88 for connection with the pickoff detector circuit 47.

Detector 47 may use any known demodulator for producing, on output line 48, a signal proportional to the difference in capacity between the differential capacitors 24 and 25. For illustration, a demodulator operating on the principles disclosed in U.S. Pat. No. 3,012,192 to Lion is illustrated. In particular, the secondary coil 88 is coupled through a diode 90 and resistor 92 to a summing junction 93. A further parallel path to the summing junction is formed through a diode 95, oppositely poled to diode 90, and a resistor 96. The junction between diode 90 and resistor 92 is coupled to the capacitor plate 16, and the junction between diode 95 and resistor 96 is coupled to the capacitor plate 17. To complete a current path through the capacitors 24 and 25, the capacitor plate 22 is connected by stray capacitance 70 to the torque coil 30, one end of which is connected through a DC path or reference line 100 to the opposite end of the secondary winding 88. The summing junction 93 is directly coupled to output line 48, and shunted to the reference line 100 through a resistor 102 and a capacitor 104.

To create a stray capacitance 70 of sufficient capacitive reactance to form an electrical connection to line 100 at the frequency of oscillator 45, the bobbin structure 32, FIG. 2, is constructed so as to locate the torque coil 30 immediately beneath and adjacent the capacitor plate member 22. The electrical path necessary to complete the detector circuit 47 is thus formed through stray capacitance to an output element of the force measuring circuit. The output element, namely torque coil 30, is in turn connected in the circuit so as to form a common reference point (herein line 100) with the pickoff detector 47, thereby completing the electrical signal path which allows the detector to otherwise operate in a known manner.

Resistors 92 and 96 in detector 47 carry opposite direction current, and form a peak charging capacitor detector. The output current on line 48 produces a corresponding voltage drop across the resistor 102 to generate a voltage input for the differential amplifier 50. While the circuit of the above identified Lion patent is illustrated, with the addition of the unique stray capacitor path 70 previously explained, other detector circuits could be used following the teachings of this invention.

Differential amplifier 50 includes a pair of PNP transistors 110 and 112 connected as a differential pair in order to drive an output stage consisting of a pair of NPN-transistor 114 and 116. A PNP-transistor 120 and a resistor 122 are coupled in series between the positive potential line 80 and the emitters of the differential transistors 110 and 112 to form a current source for the differential transistors. The current source in the input stage provides a high degree of common mode rejection. A resistor 126 is coupled between the collector of transistor 110 and potential line 82. The voltage drop across resistor 126 forms a voltage input which is coupled via a line 127 with the base of transistor 116 in the output stage.

The output stage of differential amplifier 50 includes the transistors 114 and 116 in a series circuit between the positive and negative potential lines 80 and 82. The collector of transistor 114 is directly connected to the positive line 80, and its emitter is coupled through a resistor 130 to the collector of transistor 116. To bias transistor 114, the positive potential line 80 is connected through a resistor 132 to the base of transistor 114, and also through a pair of series connected diodes 134 and 136 to the collector of transistor 116. The output resistor 52 is coupled to the junction between the emitter of transistor 114 and resistor 130. Current through resistor 52 and torque coil 30 flows directly through the load impedance $Z_L$. The load impedance is shunted by an RF bypass capacitor 140.

When an error voltage is present on line 48, transistor 110 is driven further into conduction, creating a larger voltage drop across resistor 126 in order to further bias transistor 116 into its forward conduction region. This causes increased current to flow through transistor 114, and thence through resistor 52 and torque coil 30 to the output impedance $Z_L$. A constant current output characteristic is established by the feedback arrangement which includes resistors 56, 62, 58, 66 and capacitors 64 and 60. Resistor 52 forms the series current sensing resistor. With this arrangement, constant current to any impedance substituted for torque coil 30 would be produced for a given input force. While a given torque coil connected to a voltage electronics output circuit would have the same current flowing therein for a static or steady state condition, the present circuit produces such current even during a transient condition, resulting in improved dynamic response. Thus, the feedback arrangement produces for a fixed force substantially constant current independent of the torque coil, which itself tends to produce constant current, but does so satisfactorily only for a static state. Although a particular differential amplifier 50 and associated feedback circuit are described, it will be apparent that the same advantages will result with other types of constant current output force measuring circuits when combined with a stray capacitance pickoff detector.

We claim:

1. In a servoed system having a transducer for producing between two elements a variable electrical quantity proportional to movement of a seismic mass from a null position in response to an unbalanced force, and rebalance means for causing said seismic mass to move in proportion to current therethrough, the improvement comprising:
servoamplifier means for passing current through said rebalance means to move said seismic mass to the null position when said transducer is effectively coupled to detecting means, including
means operative independent of said rebalance means for maintaining the current through said rebalance means substantially constant for a fixed unbalance force,
conductor means coupling one of said elements to said detecting means
circuit means coupling said rebalance means to said detecting means; and
mounting means locating the other of said elements and said rebalance means in spaced relation to produce a stray capacitance therebetween sufficient to electrically couple said other element to said detecting means through said circuit means.

2. The improvement of claim 1 wherein said transducer produces between said two elements a variable reactive impedance corresponding to said variable electrical quantity, said detecting means includes oscillator means producing an AC signal and means including said conductor means, said circuit means, and said stray capacitance for coupling said oscillator means across said two elements.

3. The improvement of claim 1 wherein the seismic mass of said transducer means is movable with respect to base means, means affixing a first said elements to said base means, means affixing a second of said elements to said seismic mass, and said mounting means locates said rebalance means on said seismic mass and spaced sufficiently adjacent said second of said elements to produce said stray capacitance.

4. The improvement of claim 3 wherein said mounting means comprises a bobbin forming a portion of said seismic mass and having a planar conductive surface corresponding to said second element, said rebalance winding means being wound on said bobbin and electrically insulated from said conductive surface, and electric insulating means mounting said bobbin for movement with respect to said base means.

5. The improvement of claim 1 wherein said detecting means produces an error signal proportional to the movement of said seismic mass away from said null position, and said current maintaining means includes current-sensing means for generating a feedback signal proportional to current through said rebalance means, and feedback means connecting said current-sensing means to said servoamplifier means for subtracting said feedback signal from said error signal.

6. The improvement of claim 5 wherein said servo amplifier means includes differential amplifying means with a pair of inputs and an output and having an output signal proportional to the difference between signals at the pair of inputs, means connecting said detecting means to one of said inputs, said feedback means connecting said current-sensing means to the other of said inputs, and said output being coupled to said rebalance means.

7. In a servoed system having a transducer for producing between spaced elements a variable reactive impedance proportional to movement of a seismic mass from a null position in response to an unbalance force, and rebalance means for causing said seismic mass to move in proportion to current therethrough, the improvement comprising:
servoamplifier means for passing current through said rebalance means to move said seismic mass to the null position, including
means for electrically floating and electrically referencing said elements to said rebalance means to reduce electrostatic forces across said spaced elements when current is passing through said rebalance means, and
means operative independent of said rebalance means for maintaining the current through said rebalance means substantially constant for a fixed unbalance force.

8. The improvement of claim 7 wherein said servo amplifier means includes detecting means effective when coupled to said transducer for producing an error signal amplified by said servo amplifier means to produce said current which passes through said rebalance means, and said floating and referencing means includes conductor means coupling one of said elements to said detecting means, circuit means coupling said rebalance means to said detecting means, and mounting locating the other of the said elements of said rebalance means in spaced relation to produce a stray capacitance therebetween sufficient to electrically couple said other element to said detecting means through said circuit means.

9. The improvement of claim 8 wherein said rebalance means comprises a torque coil wound between a pair of terminals, said servo amplifier means includes differential amplifying means for generating at an output a signal proportional to the difference between signals at a pair of inputs, means connecting said detecting means to one of said pair of inputs, means connecting in series the output of said differential amplifying means, said pair of terminals of said torque coil, and a resistive means forming a part of said current maintaining means, said current maintaining means further includes feedback means coupling said resistive means to the other of said pair of inputs, and said circuit means is coupled between said detecting means and one of said pair of terminals of said torque coil.

10. The improvement of claim 7 wherein said transducer comprises capacitor means having a first capacitor plate affixed to said seismic mass and a second capacitor plate affixed to base means, said first and second plates corresponding to said spaced elements, movement of said seismic mass with respect to said base means varying the capacitive reactance between said first and second capacitor plate means, said floating and referencing means reducing electrostatic forces across said first and second capacitor plate means.

11. The improvement of claim 10 wherein said servoamplifier means includes an AC detector for producing an output signal in proportion to the capacitive reactance between said first and second capacitor plate means, amplifier means for amplyifying said output signal to generate said current which passes through said rebalance means, oscillator means for generating an AC signal, said floating and referencing means includes stray capacitance means forming a sole electrical path to said first capacitor plate means and circuit means including said stray capacitance means for coupling said capacitor means to said oscillator means and said AC detector.

* * * * *